April 8, 1924. 1,489,929
E. E. CHAPMAN
FLEXIBLE TRUSS BUMPER
Filed March 3, 1923
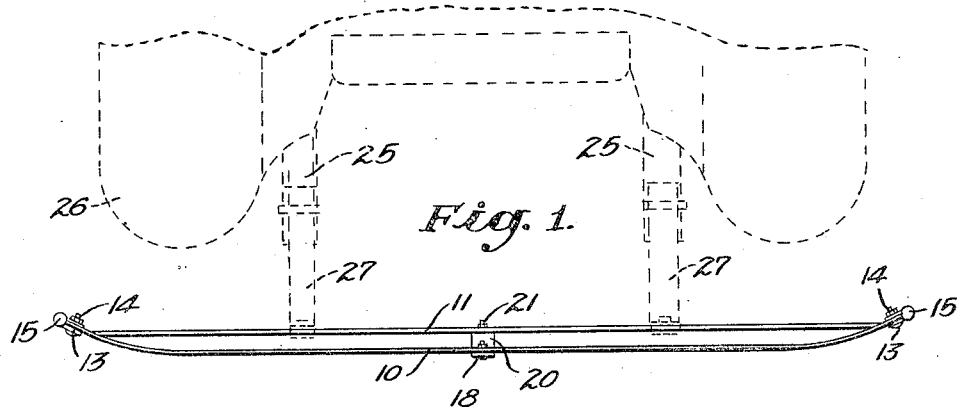
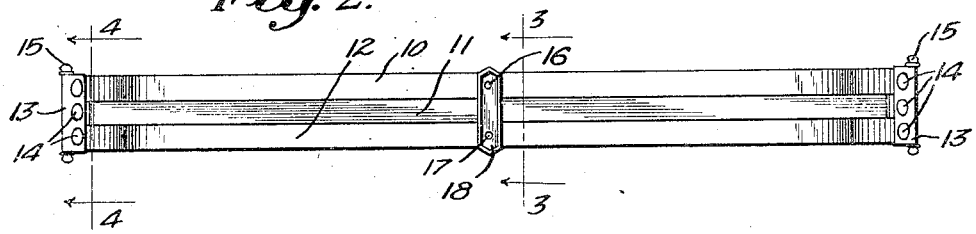
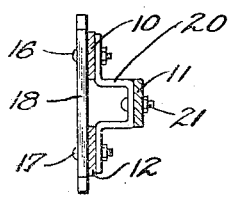
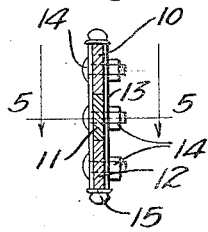
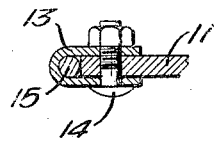
INVENTOR:
EARLE E. CHAPMAN
BY
Graham + Hume
ATTORNEYS Patented Apr. 8, 1924.

1,489,929

UNITED STATES PATENT OFFICE.

EARLE E. CHAPMAN, OF LOS ANGELES, CALIFORNIA, ASSIGNOR TO BURGER & CHAPMAN, OF LOS ANGELES, CALIFORNIA, A COPARTNERSHIP CONSISTING OF EDWIN C. BURGER AND EARLE E. CHAPMAN.

FLEXIBLE TRUSS BUMPER.

Application filed March 3, 1923. Serial No. 622,692.

*To all whom it may concern:*

Be it known that I, EARLE E. CHAPMAN, a citizen of the United States, residing at Los Angeles, in the county of Los Angeles, State of California, have invented a new and useful Flexible Truss Bumper, of which the following is a specification.

My invention relates to vehicle bumpers and the object of the invention is to provide a vehicle bumper which will have certain advantages over the common type now being manufactured.

Referring to the drawings, which are for illustrative purposes only,

Fig. 1 is a plan view of a preferred embodiment of my invention, showing the method of application to the automobile.

Fig. 2 is a front elevation.

Fig. 3 is a section on a plane represented by the line 3—3 of Fig. 2.

Fig. 4 is a section on a plane represented by the line 4—4 of Fig. 2, and

Fig. 5 is a section on a plane represented by the line 5—5 of Fig. 4.

In the form of the invention disclosed, I provide a bumper consisting of three bars 10, 11 and 12, the bars 10 and 12, being hereinafter referred to as the "front bars" and the bar 11 being hereinafter referred to as the "back bar." Each end of each bar is secured inside a plate 13 shown as a vertically-extending rebent or channel element by means of bolts 14, an ornamental pin 15 being secured as shown. The pin 15 has no mechanical function, being merely for ornamental purposes.

Secured by means of bolts 16 and 17 to a plate 18 on the front of the bumper through the bars 10 and 12 is a spacer 20, an offset central portion of this spacer being secured by means of a bolt 21 to the rear bar 11, the member 18 being in the center of the bumper as shown in the drawing.

The bumper is secured to the frame 25 of an automobile 26 by any suitable form of bracket 27. These brackets, being well known in the art, need not be described. They engage the rear bar 11 at a point intermediate between the member 18 and the ends of the bar. This construction allows the full flexibility of all three bars to be brought into play in the event that the bumper strikes or is struck against an interfering body.

I claim as my invention:

1. A vehicle bumper comprising three bars having their ends lying in the same plane, these ends being rigidly secured to a common member; means for spacing one of the bars away from the other two near the center thereof; and means for attaching the bumper to an automobile.

2. In a bumper as described in claim 1, end-securing members in the form of vertically-extending channel elements.

3. In a bumper as described in claim 1, central spacing means comprising a member provided with a central offset.

In testimony whereof, I have hereunto set my hand at Los Angeles, California, this 24th day of February, 1923.

EARLE E. CHAPMAN.